Dec. 27, 1955 V. G. KLEIN ET AL 2,728,578
RECORD PLAYER

Filed Jan. 7, 1950 6 Sheets-Sheet 1

Victor G. Klein,
Carl H. Mueller,
Inventors,
Haynes and Koenig,
Attorneys.

Dec. 27, 1955   V. G. KLEIN ET AL   2,728,578
RECORD PLAYER

Filed Jan. 7, 1950    6 Sheets-Sheet 2

Victor G. Klein,
Carl H. Mueller,
Inventors,
Haynes and Koenig,
Attorneys.

Dec. 27, 1955 V. G. KLEIN ET AL 2,728,578
RECORD PLAYER

Filed Jan. 7, 1950 6 Sheets-Sheet 3

Victor G. Klein,
Carl H. Mueller,
Inventors
Haynes and Koenig,
Attorneys.

Dec. 27, 1955  V. G. KLEIN ET AL  2,728,578
RECORD PLAYER
Filed Jan. 7, 1950  6 Sheets-Sheet 4

Victor G. Klein,
Carl H. Mueller,
Inventors,
Haynes and Koenig,
Attorneys.

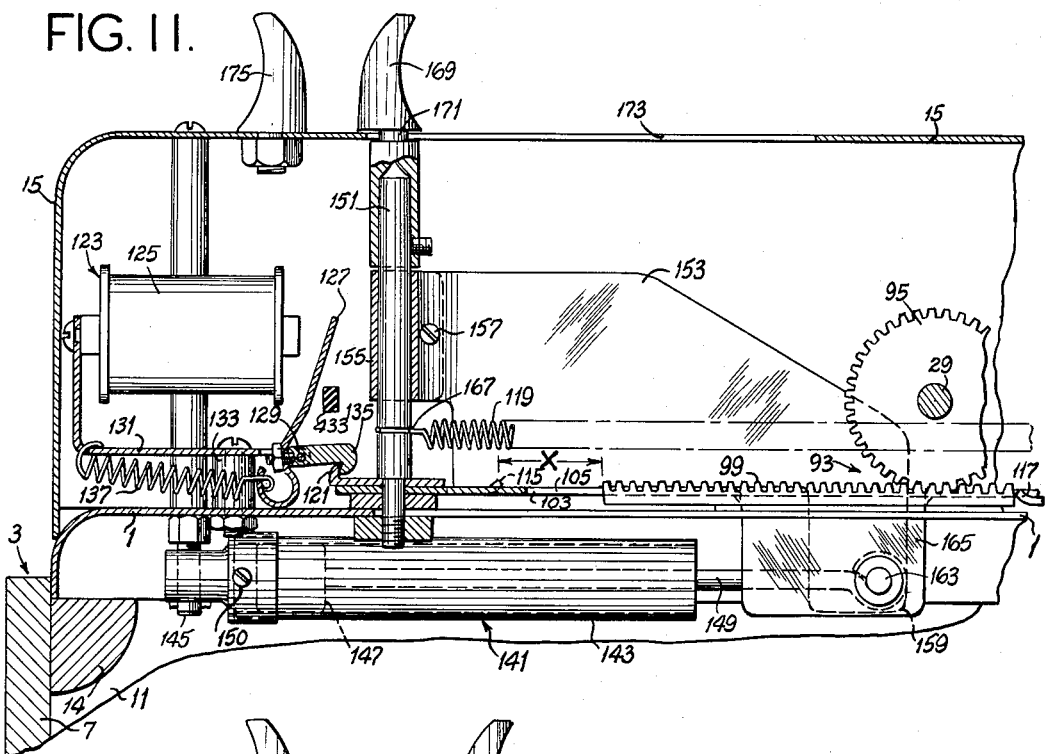
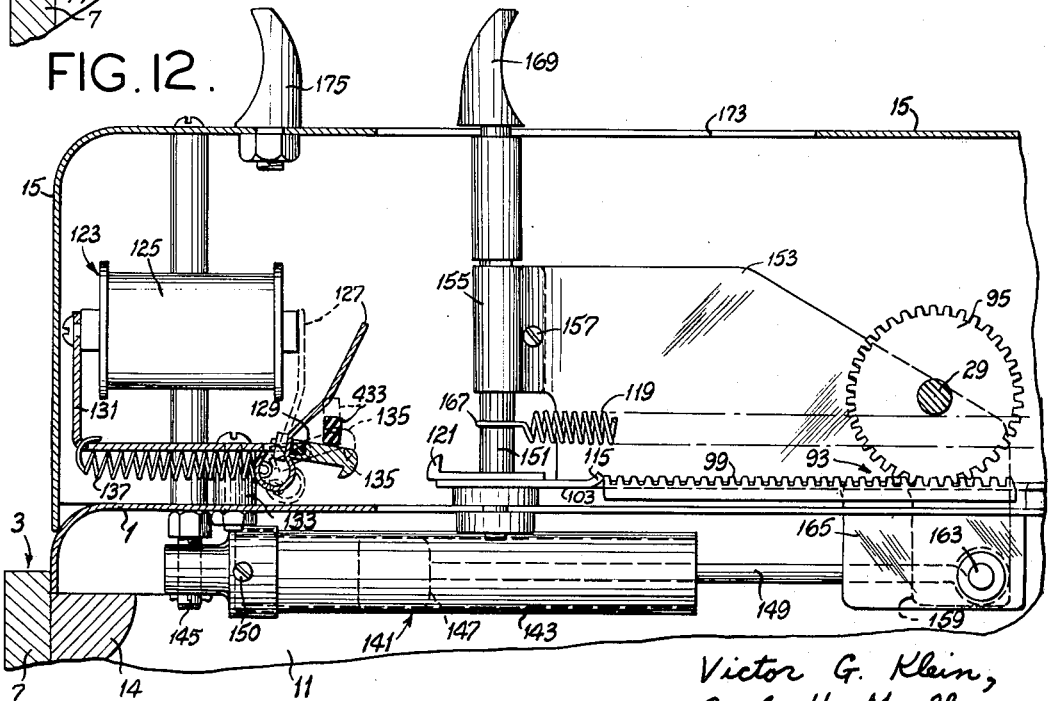

Dec. 27, 1955 V. G. KLEIN ET AL 2,728,578
RECORD PLAYER

Filed Jan. 7, 1950 6 Sheets-Sheet 6

Victor G. Klein,
Carl H. Mueller,
Inventors,
Haynes and Koenig,
Attorneys.

United States Patent Office 2,728,578
Patented Dec. 27, 1955

2,728,578

RECORD PLAYER

Victor G. Klein, Overland, and Carl H. Mueller, St. Louis, Mo., assignors to Lincoln Engineering Company, St. Louis, Mo., a corporation of Missouri Application January 7, 1950, Serial No. 137,446

25 Claims. (Cl. 274—10)

This invention relates to record players, and more particularly to a record player for automatically playing a single record on one side, turning it over, and playing its other side.

The object of the invention is the provision of a relatively simple, reliable, jam-proof record player for automatically playing a single record on one side, turning it over and playing its other side, which may be manufactured at relatively low cost to make available an inexpensive record player which is capable, with present-day long-playing records, of providing up to about one hour of uninterrupted playing without manual intervention. For example, there are presently available 33⅓ R. P. M. long-playing records of twelve-inch diameter which play up to about thirty minutes per side. With the record player of this invention, such a record may be played on one side and automatically turned over and played on its other side to provide up to about one hour of playing without requiring any manual operation in turning the record and playing its second side.

In general, a record player of this invention includes an invertible turntable, so mounted as to be movable between an initial position facing in one direction for playing the first side of a record thereon and a turned-over final position facing in the opposite direction for playing the other side of the record. The record is removably held on the turntable by any suitable means for the purpose. The turntable and the means for holding a record thereon are such that both faces of a record on the turntable are exposed for playing. A tone arm is provided for first playing one side of a record on the invertible turntable when the latter is in its initial position, and for subsequently playing the other side of the record when the turntable and record are turned over to final position. The turntable is driven by a motor through a drive adapted to maintain the direction of rotation of the turntable in respect to the tone arm the same when in final position as when in initial position. The invention includes as one of its features a special drive for the purpose, adapted to eliminate any irregularities in rotation of the turntable such as cause distortions in reproduction known in the art as "wow" and "rumble" without expensive construction. A fundamental feature of the invention is the provision of a manually actuated mechanical energy accumulator wherein energy is stored up by a simple manual operation prior to playing a record and released at the end of playing the first side of a record on the turntable for retracting the tone arm to clear the record, turning the record over, and then returning the tone arm to start playing the other side of the record. With this arrangement, once the playing of the first side of a record has been manually instigated, both the record turn-over and operation of the tone arm to start the playing of the other side of the record are automatically carried out by means powered by energy stored in the accumulator. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a plan view of a record player of this invention, a record holder being removed;

Fig. 11 is an enlarged vertical section taken on line 11—11 of Fig. 4, illustrating certain parts in one operating position, parts being omitted;

Fig. 12 is a view similar to Fig. 11 illustrating parts in another operating position;

Similar reference characters indicate corresponding parts throughout the several views of the drawings.

Figure 1:
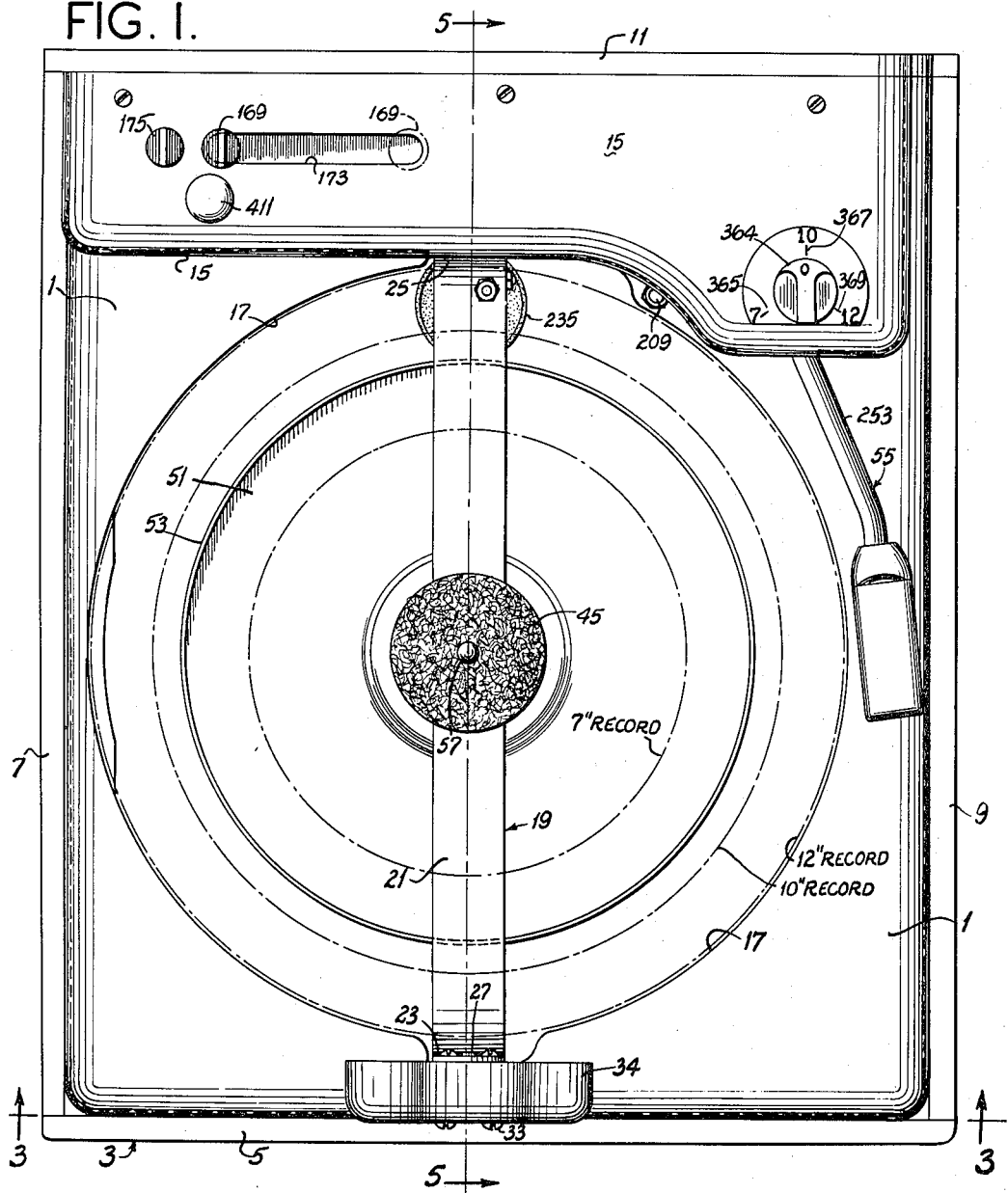

Referring to the drawings, first more particularly to Figs. 1 and 3–5, a record player embodying the invention is shown generally to comprise a mechanism support in the form of a horizontal rectangular table or deck 1. This may be stamped from sheet metal and forms the top of a cabinet 3 having a front wall 5, left and right side walls 7 and 9, a rear wall 11, and a bottom 13. The deck 1 rests at its sides on ledges 14 adjacent the upper edges of the side walls. The rear wall 11 of the cabinet extends higher than the side and front walls of the cabinet to close off the rear of a housing 15 at the rear of the deck 1 for concealing elements of the mechanism of the record player. The deck is formed with a cricular opening 17 of somewhat larger diameter than the diameter of the largest record which the record player is to accommodate, for example, a standard twelve-inch long-playing record, to be driven at 33⅓ R. P. M.

Extending from front to rear diametrically across the opening 17 is a turntable cradle 19. This consists of a sheet metal stamping in the form of a beam 21 having crank arms 23 and 25 at its forward and rearward ends respectively. The cradle is journalled for swinging movement about a horizontal axis A—A located above the deck 1 and extending from front to rear through the ends of the crank arms by means of trunnions or pivots 27 and 29. The pivot 27 extends through a sheet metal bearing plate 31 secured to the deck at the front of the opening 17 as indicated at 33. The plate 33 is concealed by a housing 34 secured to the deck. The pivot 29 extends through a vertical sheet metal bearing plate 35 extending upward from the deck at the rear of the opening 17. The arrangement is such that the cradle may swing through 180° between the upright position shown in solid lines in Fig. 5 wherein the beam 21 is downward, this position being determined by a stop screw 39 (see Figs. 3 and 15) adjustably threaded in a flange 41 formed on the plate 31 for engagement with crank arm 23, and the inverted position shown in dotted lines in Fig. 5 wherein the beam is upward, this position being determined by a stop screw 43 adjustably threaded in flange 41 above screw 39 for engagement with crank arm 23.

The turntable cradle 19 carries a turntable 45 of such diameter as to be engaged only by the central ungrooved portion of a conventional record, thereby to expose both sides of a record for playing. The turntable is mounted for rotation on an axis B—B at right angles to the axis A—A at the center of the cradle. The turntable is fixed on a turntable shaft 47 journalled in a bearing 49 at the center of the cradle beam 21 with its soft-surfaced record-engaging face offset from the cradle axis A—A in the direction toward the beam 21 a distance approximately half the thickness of a conventional record. The turntable is located on the same side of the beam 21 as the axis A—A; consequently when the beam is down the turntable is in upright position facing upward. When the cradle is swung 180° to its inverted position with beam 21 up, the turntable is swung to inverted position facing downward. A record held on the turntable, however, will occupy substantially the same horizontal plane—the horizontal plane including axis A—A—whether the turntable is upright or inverted. A turntable flywheel and drive gear 51, herein illustrated as a circular sheet metal stamping formed with an annular flange 53, is fixed on the end of the turntable shaft 47 on the other side of the beam 21 from the turntable, with sufficient space between a record on the turntable and the flywheel to permit reception of the tone arm 55 of the record player.

Figure 2:
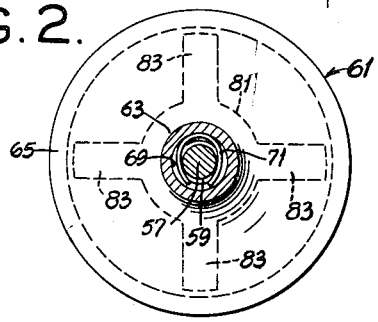
Fig. 2 is an enlarged horizontal section taken on line 2—2 of Fig. 5.

The turntable shaft 47 extends beyond the turntable to form a record centering pin 57. This is formed with an annular groove 59. At 61 is shown a record holder for holding a record on the turntable when the latter is inverted and for pressing a record against the turntable whether the latter is upright or inverted to insure that the record will not slip relative to the turntable. This record holder, as shown in detail in Figs. 2 and 5, comprises a knob 63 formed with an annular flange 65 at its lower end, the flange having a diameter corresponding to the diameter of the turntable. The knob has an axial opening or bore 67 having a diameter slightly greater than the diameter of the centering pin 57 enlarged as by counterboring at its lower end as indicated at 69. An elliptical wire spring 71 is held between the shoulder 73 at the upper end of the counterbore 69 and the upper end of a bushing 75 press-fitted in the counterbore 69. The minor axis of the ellipse is less than the diameter of the pin 57. The bushing 75 has a bore 77 on a diameter corresponding to that of the bore 67 and has a flange 79 at its lower end which holds in place the hub of a spider 81 having spring fingers 83 normally bent downward and adapted resiliently to bear against a record on the turntable to press it against the turntable when the spring 71 snaps into the groove 59. A button 85 has a shank 87 slidable in the bore 67 and extending through a reduced-diameter opening 89 in the upper end of the knob. The lower end of the shank is enlarged as indicated at 91 to prevent it from being pulled out.

To hold a record on the turntable, the holder 61 is applied on the centering pin 57 and pressed downward until the wire spring 71 snaps into the groove 59. The groove 59 is spaced such a distance from the turntable and the spring 71 is spaced such a distance from the lower end of the knob that when the spring 71 is in the groove 59, spring fingers 83 resiliently bear against the record to press it against the turntable. When the holder is applied, the button 85 is pushed out to its Fig. 5 position by the centering pin 57. To remove the holder so as to remove a record, the knob is grasped between the first and second fingers with the thumb bearing down on the button, and pulled up by the fingers to snap the detent spring 71 out of the detent groove 59.

The turntable cradle 19 is adapted to be swung about its pivotal axis A—A through 180° between the limiting positions determined by the stops 39 and 43 by rack and pinion mechanism generally designated 93. This comprises a pinion 95 fixed on the rearward pivot 29 of the cradle in the rear of the vertical bearing plate 35. This plate is bent upward from a horizontal slide bearing plate 97 fixed on the deck 1. In mesh with the pinion is a free floating rack 99. This slides in a horizontal plane on the horizontal plate 97 in the direction transverse to the axis A—A, being held in mesh with the pinion by being confined between the vertical plate 35 and guide pins 101. The rack is adapted to be driven in one direction and the other by a slide 103 mounted for straight-line sliding movement in a horizontal plane on the slide bearing plate 97 in the direction transverse to the axis A—A. The slide 103 comprises an elongate sheet metal plate having lengthwise slots 105 and 107. It is guided for sliding movement in the stated direction by a stud 109 extending upward from plate 97 through the slot 105 and by a tubular post 111 extending upward from the plate 97 through the slot 107.

Figure 4:
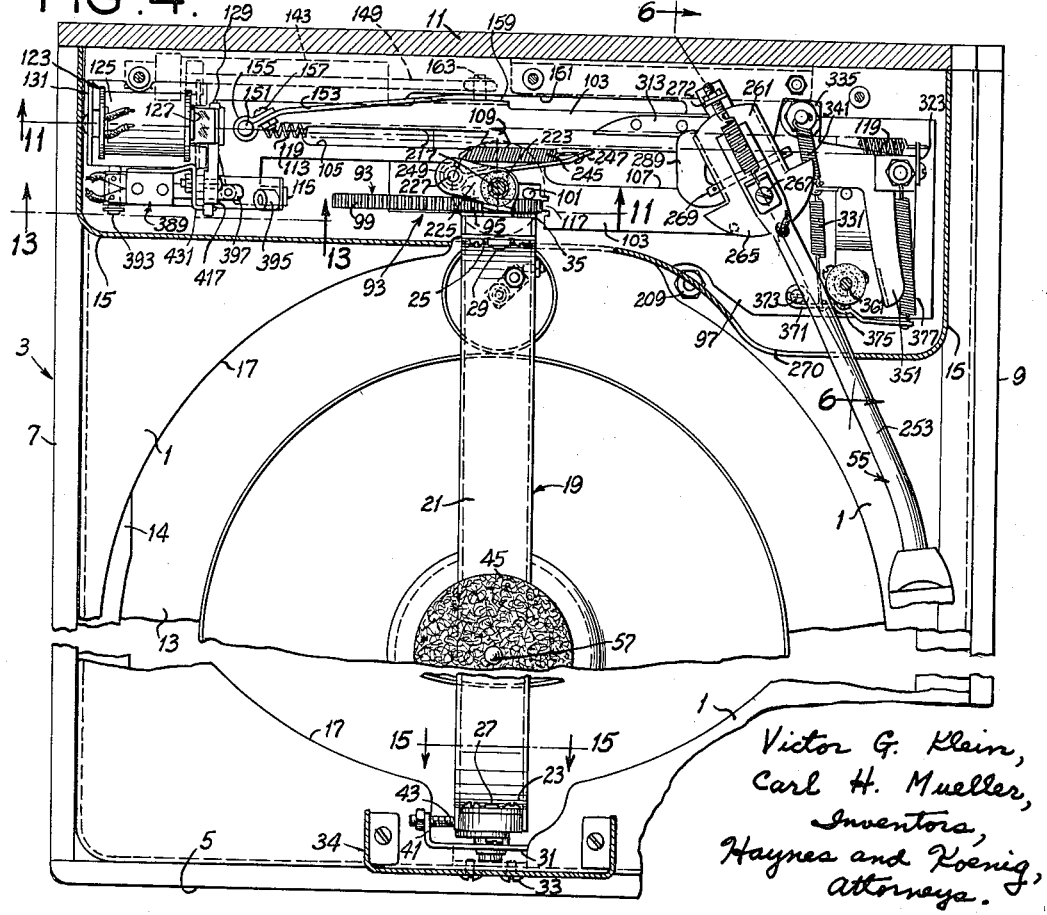
Fig. 4 is a plan view similar to Fig. 1 with a mechanism housing broken away and shown in section, and with other parts broken away.

The slide 103 has an elongate notch 113 in its edge toward the front of the record player. At one end of this notch is a finger 115 having a bent-up end forming an abutment adapted to engage the left end of the rack as viewed in Figs. 4 and 11–13. At the other end of the notch is a bent-up finger 117 forming an abutment adapted to engage the other end of the rack. The ends of fingers 115 and 117 are spaced apart a distance greater than the length of the rack. The slide is biased toward the right as viewed in Figs. 4 and 11–13 by a tension spring 119. This constitutes an energy accumulator. At the left end of the slide is an upstanding detent finger 121. Coacting with this finger is an electromagnetic latch generally designated 123 comprising a coil 125 and an armature 127 pivoted at 129 on a coil support 131. The latter is mounted above the deck 1 on spacer posts 133. The armature carries a latch hook or catch 135 engageable with the detent finger 121. The catch is biased into latching position by a tension spring 137 located under the coil support 131. The arrangement is such that the slide 103 may be moved to the left as viewed in Figs. 4 and 11–13 to a cocked or set position wherein spring 119 is tensioned or loaded, and the slide is latched in this position by the engagement of the catch 135 and finger 121. When the slide 103 is moved to its cocked or set position, finger 117 on the slide engages the right end of the rack 99 and pushes the rack to the left. This rotates pinion 95 clockwise, after an initial interval of lost motion, and swings the turntable to its upright position determined by engagement of crank arm 23 with the lower stop 39. With the slide 103 in cocked or set position, the end of the finger 115 is spaced from the left end of the rack a distance X (Fig. 11) and finger 117 is in engagement with the right end of the rack (Fig. 4).

The catch 135 is released to be biased into latching position by spring 137 whenever the coil 125 is deenergized. When the coil 125 is energized, the armature 127 is retracted and swings up the catch 135 to release the slide 103. Upon such release, the slide is pulled to the right by the spring 119. Movement of the slide is retarded by a dashpot retarding mechanism generally designated 141. As shown, this retarding mechanism comprises a dashpot cylinder 143 which extends transversely under the deck 1 adjacent the rear of the deck and at its left. The left end of the dashpot is secured to a stud 145 which extends down from the deck. A piston 147 is slidable in the cylinder and a piston rod 149 extends from the piston out of the right end of the cylinder. The cylinder has a bleed hole in which a screw 150 is threaded for adjusting the retarding action of the dashpot. A post 151 is fixed at its lower end to the left end of the slide 103 and extends upward from the slide. A vertical plate 153 is fixed to this post as by having a collar portion 155 surrounding the post and clamped on the post by a bolt and nut fastener 157. The plate 153 extends to the right from the post, angling toward the rear of the record player so that its left end clears the slide 103, and at its left end has a downward extension 159 which extends through an elongate tranverse slot 161 in the deck 1. A stud 163 connects the extension 159 and a flange 165 bent down from the slide 103 and extending down through the slot 161. The end of the piston rod 149 is connected to the stud 163. The spring 119 is connected at its left end to the post 151 under the collar 155 as indicated at 167. When the catch 135 is released upon energization of the coil 125, slide 103 moves relatively slowly to the right under the bias of spring 119, its movement being retarded by the dashpot. It moves through the distance X indicated in Fig. 11 before finger 115 engages the right end of the rack (finger 117 moving through this same distance away from the right end of the rack). Then, after finger 115 engages the left end of the rack, slide 103 continues to move to the right and finger 115 pushes the rack to the right thereby rotating the pinion 95 counterclockwise as viewed from the front of the record player. This initiates counterclockwise swinging of the turntable to its inverted position determined by engagement of crank arm 23 with the upper stop 43. The slide 103 and the rack 99 ultimately come to rest in the released position shown in Fig. 9, wherein the finger 117 is spaced from the right end of the rack the distance Y. An operating knob 169 is fixed to the upper end of the post 151. This knob is at the upper end of a shank 171 secured on the upper end of the post and extending through an elongate slot 173 in the top of the housing 15 extending transversely of the record player (see Figs. 1, 11 and 12). The slide 103 is moved to cocked or set position (with attendant loading of the spring 119) by manually moving the knob 169 from the right end to the left end of the slot 173. This is facilitated by providing a knob 175 fixed on the top of the housing 15 adjacent the left end of the slot 173.

Figure 3:
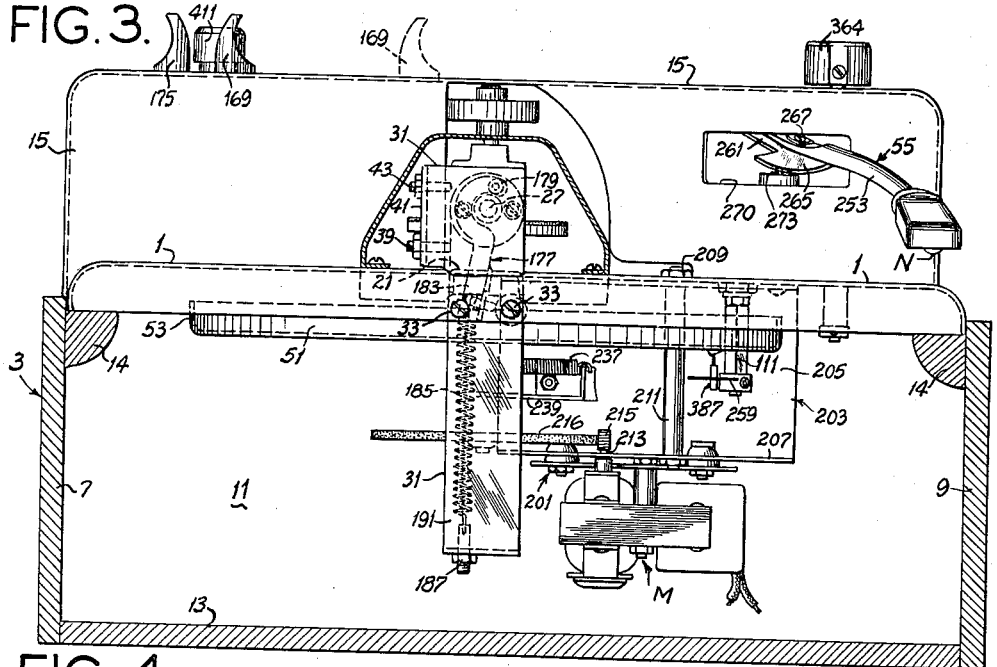
Fig. 3 is a vertical section taken on line 3—3 of Fig. 1.
Figure 5:
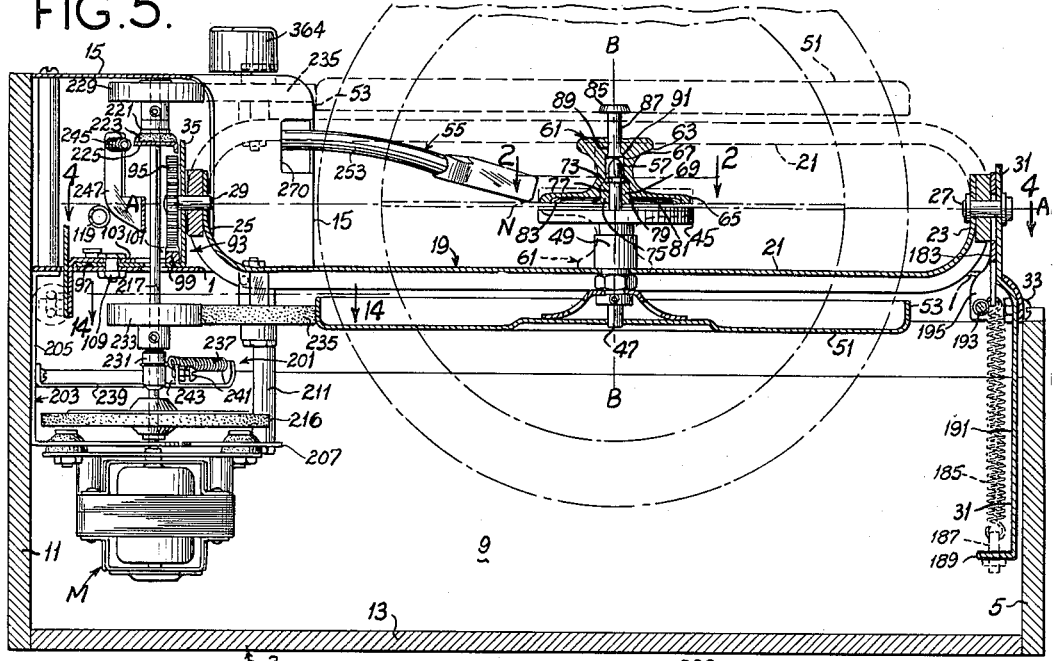
Fig. 5 is a vertical section taken on line 5—5 of Fig. 1, illustrating the record holder in place.
Figure 15:
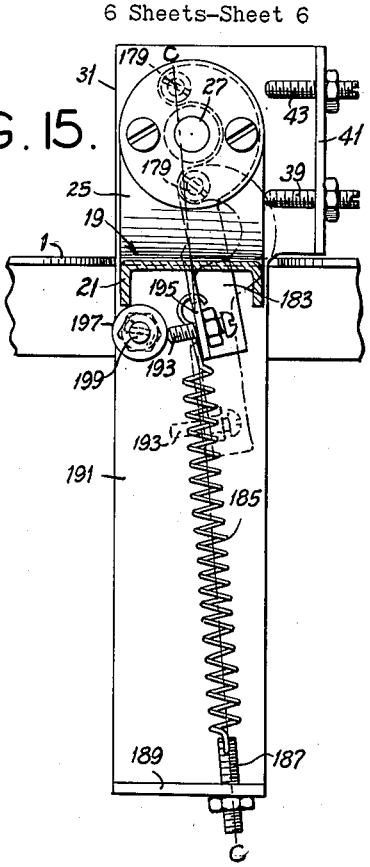
Fig. 15 is an enlarged vertical section taken on line 15—15 of Fig. 4.
Figure 16:
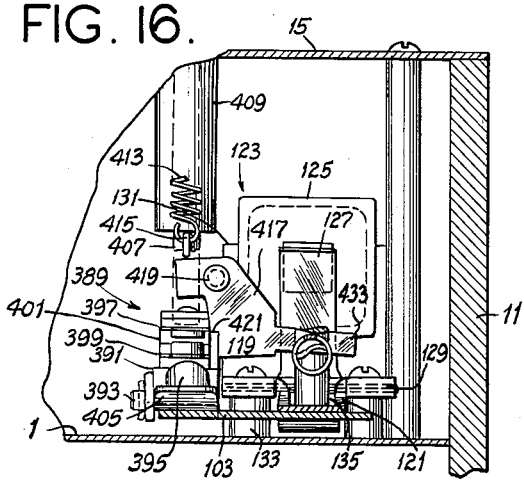
Fig. 16 is a vertical section taken on line 16—16 of Fig. 13, illustrating parts in one operating position.
Figure 17:
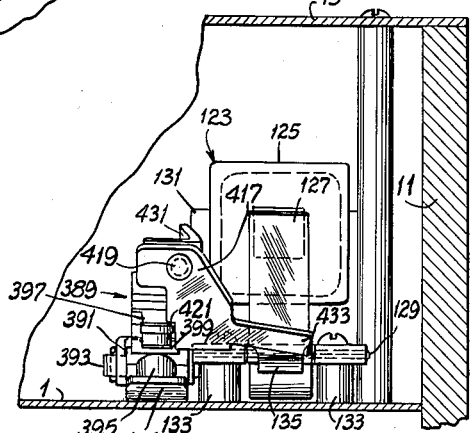
Fig. 17 is a view similar to Fig. 16 illustrating parts in another operating position; and, Fig. 18 is a wiring diagram.

Figs. 3, 5 and 15 show a spring mechanism coupled to the cradle which becomes loaded when the cradle is swung to upright position and acts to swing the cradle to inverted position. It also acts as an overcentering mechanism particularly to hold the cradle in inverted position against the stop 43, as will be made clear. As shown in Figs. 3, 5 and 15, this spring mechanism comprises a link 177 pivotally connected at its upper end to the crank arm 23 at 179, off center with respect to the pivot 27 and axis A—A. The pivot 179 is located above and to the right of the pivot 27 when the cradle is in upright position as shown in Fig. 3 (to the left as shown in Fig. 15). The link 177 has a C-shaped portion 181 which curves around the pivot 27 on the left of the pivot 27 and a downwardly extending lower end portion 183. A tension spring 185 is connected at its upper end to the lower end portion 183 of the link and at its lower end to a screw 187 adjustably threaded in a flange 189 formed at the lower end of a downward extension 191 of the bearing plate 31. A screw 193 is adjustably threaded in a flange 195 on the lower end portion 183 of the link. The end of the screw is engageable with a camming roller 197 rotary on a stud 199 fixed to the plate 31 in such position that when the turntable cradle 19 is upright, the lower end of the link is cammed over to such an extent that the line C—C joining the center of pivot 179 and the point of attachment of the upper end of the spring 185 is so located that the spring 185 exerts only a light overcentering action tending to swing the cradle counterclockwise, as viewed from the front of the record player (clockwise as viewed in Fig. 15). Only light overcentering action is necessary, because the cradle is locked in upright position by the locking action of the pinion 95 and the rack 99, and any considerable overcentering action would actually be undesirable as it would require considerable force to overcome it when the cradle is swung to inverted position. By substantially reducing this overcentering action, the turnover action is smoothed out.

When the catch 135 is released, slide 103 is pulled to the right by spring 119. After an interval of lost motion as regards the rack 99, during which the slide moves through the distance X, finger 115 on the slide engages the left end of the rack and pushes it to the right, thereby rotating pinion 95 counterclockwise and initiating inversion of the cradle. Spring 185 thereupon acts to cause the cradle to invert. With the cradle in inverted position, the pivot 179 is located as shown in dot-dash lines in Fig. 15, and spring 185 has an overcentering action tending to hold the cradle in inverted position with crank arm 23 engaged against stop 43. This overcentering action is important because when the turntable cradle is inverted, the pinion 95 and rack 99 have no effect to lock the cradle from turning clockwise as viewed from the front of the record player, and spring 185 biases the cradle counterclockwise to hold it against the stop 43.

The turntable is driven by an electric motor M through a drive generally designated 201 adapted to drive the turntable at the proper speed and in the proper direction for playing a record, with a minimum of "wow" or "rumble." As herein illustrated, the drive effects rotation of the turntable at 33⅓ R. P. M., but it will be understood that the principles are applicable to record players or other devices to be driven at other speeds. As shown in Figs. 3 and 5, the motor M is mounted under the deck 1 by means of a bracket 203 formed of a sheet metal plate bent to have a vertical part 205 and a horizontal part 207 spaced below the deck. The horizontal part may be braced by a bolt 209 extending down from the deck with a spacer 211 surrounding the bolt between the deck and part 207. The motor is mounted with its shaft 213 extending vertically. On the upper end of the shaft is a friction pinion 215, herein shown as consisting of a spring coiled tightly around the upper end of the shaft. Pinion 215 meshes with a rubber-rimmed friction gear 216 fixed on the lower end of a vertical drive shaft 217 (Figs. 3 and 5).

The shaft 217 extends upward through an opening in the deck 1 and the plate 97 generally in the vertical plane including the cradle axis A—A and to the rear of and closely adjacent the pinion 95. It extends through the notch 113 in the slide 103. Adjacent its upper end, the shaft 217 is journalled in a bearing 221 fixed in a grommet 223 of rubber or the like, the grommet being fixed in an aperture in the outer end of an arm 225 pivoted for swinging movement about a vertical axis on the upper end of a post 227 extending upward from the plate 97. A friction gear 229 is fixed on the upper end of the shaft 217 above the bearing 221 and serves to keep the shaft from sliding downward out of the bearing. The shaft is also journalled in a bearing 231 located above the friction gear 216. A friction gear 233, of the same diameter as gear 229, is fixed on the shaft above bearing 231, but below the deck 1. Gears 229 and 233 are spaced on opposite sides of the axis A—A a distance corresponding to the throw of a rubber idler gear 235 carried by the cradle 19 in mesh with the flywheel drive gear 51. The arrangement is such that when the turntable is upright the idler gear 235 engages the lower friction gear 233, and when the turntable is inverted the idler gear engages the upper friction gear 229. It will be seen that when the turntable is upright, the flywheel 51 and idler gear 235 are below the cradle beam 21, and when the turntable is inverted, the flywheel and idler gear are above the beam.

Figure 14:
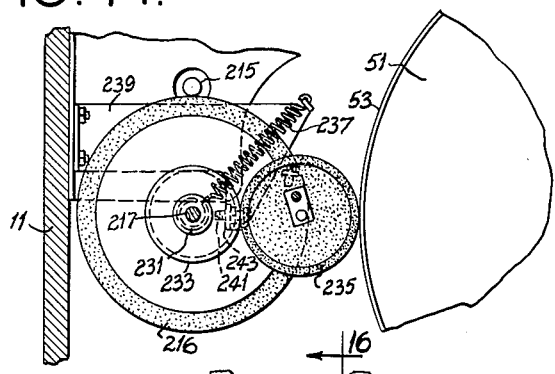
Fig. 14 is a horizontal section taken on line 14—14 of Fig. 5.
Figure 13:
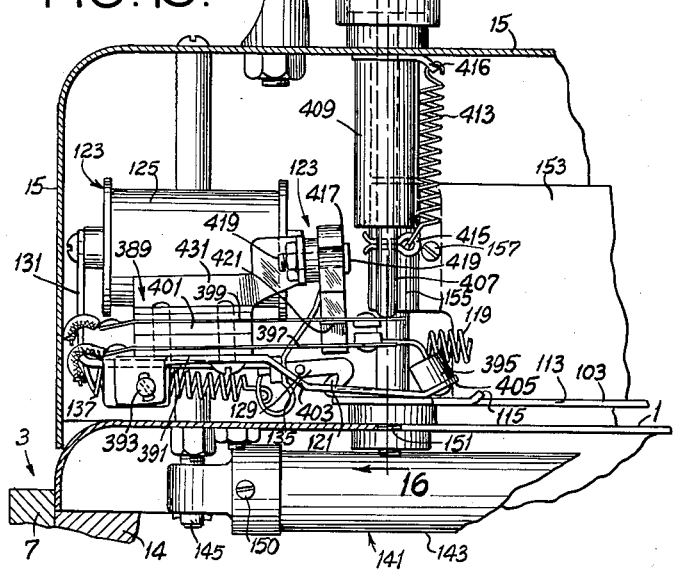
Fig. 13 is an enlarged vertical section taken on line 13—13 of Fig. 4.

The rubber grommet 223 acts as a universal joint so that the shaft 217 is adapted for universal movement. A tension spring 237 (Figs. 5 and 14) is connected at one end to the bearing 231 and at its other end to a bracket plate 239 mounted on the vertical plate 205 of the motor mounting bracket 203, with the spring pulling in such direction as to bias the shaft in such direction as to keep the gear 216 in frictional driving engagement with the pinion 215 and to keep the lower friction gear 233 in frictional driving engagement with the idler gear 235 when the turntable is upright. Spring 237 keeps the bearing 231 from rotating. When the turntable is inverted, and the idler gear 235 rides off the gear 233, bearing 231 comes into engagement with a stop screw 241 adjustably threaded in a bent-up ear 243 on the bracket 239 to limit the swing of the shaft. When the turntable is inverted, the idler gear 235 comes into frictional driving engagement with the upper friction gear 229, the latter being biased into frictional driving engagement with the idler gear by means of a tension spring 245 (Fig. 4) connected at one end to the arm 225 and at its other end to a sheet metal member 247 formed with a collar 249 clamped on the post 227.

The direction of the drive is such as to drive the turntable clockwise as viewed from above both when it is upright and when it is inverted. It will be seen that while the direction of rotation of the turntable remains the same as viewed from above, when the turntable is swung from upright to inverted position, its direction actually reverses with respect to the cradle 19. It will also be seen that with the shaft 217 having the universal or floating mounting illustrated and described, it is self-adjusting as regards bearing misalignment or wear and hence has the effect of eliminating "wow" and "rumble" without expensive construction.

Figure 6:
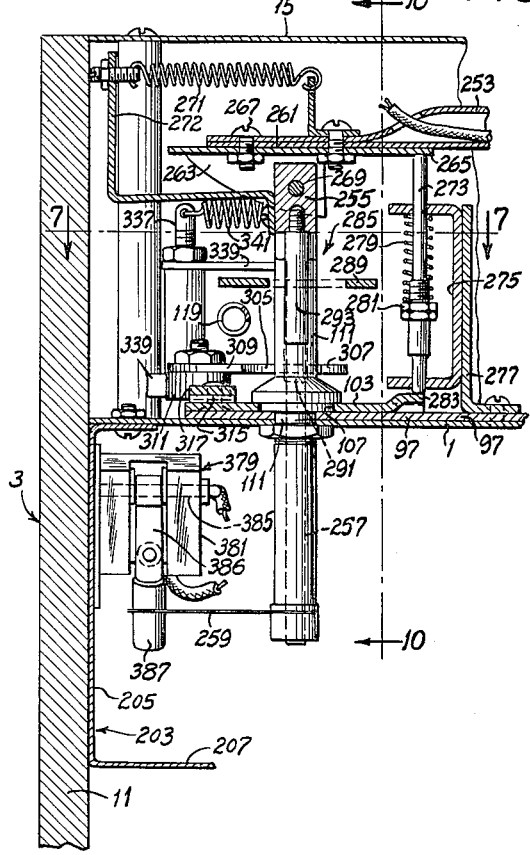
Fig. 6 is an enlarged section taken substantially on line 6—6 of Fig. 4.
Figure 10:
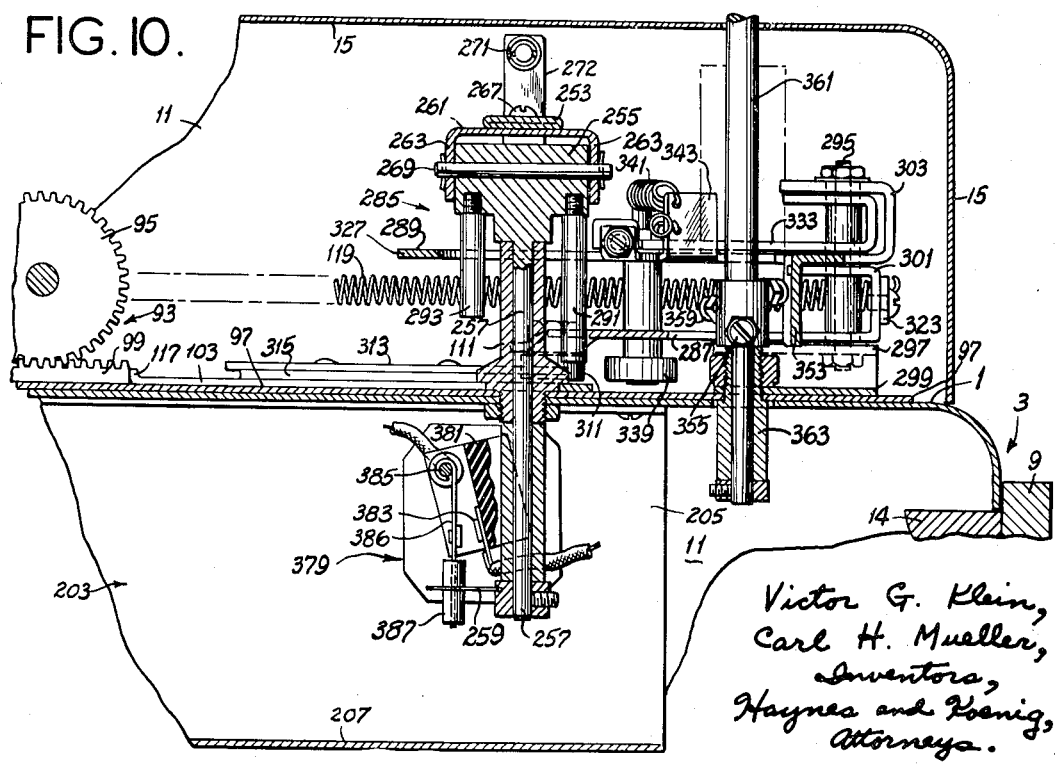
Fig. 10 is a vertical section taken on line 10—10 of Fig. 6.

The tone arm of the record player is designated 253. This is mounted for swinging movement about a vertical axis adjacent the right rear corner of the deck and also for swinging movement about a horizontal axis. As shown best in Figs. 4, 6 and 10, the tone arm is mounted at its rearward end for swinging movement about a horizontal axis on a head 255 fixed on the upper end of a rod 257 rotary in the tubular post 111. The rod extends down through an opening in the deck and at its lower end below the deck carries a tone arm switch operating finger 259. The tone arm is pivoted on the head 255 by means of a pivot member 261 formed of a sheet metal blank shaped and stamped to have downturned side flanges 263 and an arcuate forward part 265. The rearward end of the tone arm is secured upon the top of the member 261 as by bolts 267. The flanges 263 of the member 261 straddle the sides of the head 255 and a pivot pin 269 extends horizontally through the flanges and the head. The tone arm extends through an opening 270 in the forward wall of the housing 15 (Figs. 3 and 4).

The tone arm is biased downward by its own weight to a lowered record-playing position wherein its needle N may track in a record groove, being counterbalanced by a spring 271 fixed at one end to a bracket 272 secured to the head 255 and at its other end to the tone arm. It is adapted to be raised to lift the needle out of a record groove by a cam follower rod 273 (see Figs. 6–9) mounted for vertical reciprocation under the forward part 265 of member 261 in a C-shaped bearing member 275 carried by a bracket 277 secured upon the plate 97. The lower end of the rod 273 bears against the slide 103. The rod is biased downward for engagement of its lower end with the slide by a compression spring 279 (Fig. 6) which surrounds the rod and reacts from the upper arm of member 275 against a nut 281 threaded on the rod. The slide 103 is formed with an elongate raised boss 283 extending transversely of the record player in alignment with the rod 273. The boss 283 functions as a cam for lifting the rod 273 thereby to raise the tone arm. The boss or cam 283 is somewhat shorter than the stroke of the slide 103 and its phasing is such that the rod 273 is lifted immediately after the slide starts to move to the right upon release of the catch 135 and remains lifted until the slide nears the right end of its stroke, whereupon the lower end of the rod rides off the cam, and the rod and the tone arm are lowered. The forward part 265 of member 261 is of such extent that it is engageable by the rod 273 in any arcuate position of the tone arm.

The tone arm is adapted to be raised as above described and swung on its vertical pivotal axis from an end-of-play position at the conclusion of playing the first side of a record on the upright turntable to a retracted position clear of the largest record which the record player is to accommodate to permit the turntable with the record thereon to invert and, after inversion of the record, to be returned and lowered into position for starting the playing of the second side of the record. Swinging of the tone arm about its vertical axis is effected by tone arm control means generally designated 285. As shown best in Figs. 6–10, this means comprises a tone arm retracting lever 287 and a tone arm return lever 289, "return" here being used in the sense that the tone arm is returned to playing position to start playing a record. The retracting lever 287 acts on a pin 291 which extends down from the head 255 on the right side of the post 111 as viewed from the front of the record player. The return lever 289 acts on a pin 293 which extends down from the head 255 on the diametrically opposite side of the post 111. Both levers 287 and 289 are pivoted for swinging movement in horizontal planes about a vertical axis adjacent the right rear corner of the deck 1 and above the deck on a vertical stud 295 which extends upward from a bracket plate 297 cantilevered from a mounting on the plate 97 at 299 over and above the slide 103. The right end of the slide 103 works under the cantilevered part of the plate 299. The levers 287 and 289 are bent to C-shape at their pivot ends as indicated at 301 and 303, so that, with lever 287 bearing on the plate 297, lever 289 bears on the upper part of the C-shaped bend of lever 287.

The tone arm retracting lever 287 extends to the left from its pivot at 295 and its left end is bifurcated as indicated at 305. The pin 291 extends down between the sides of the bifurcation. The arrangement is such that when the lever 287 is swung clockwise as viewed from above, the side 307 of the bifurcation toward the front of the record player comes into engagement with the pin 291 and swings the head 255 and the tone arm 253 counterclockwise as viewed from above. Mounted on the bottom of the other side 309 of the bifurcation is a cam follower roller 311. This is engageable by a cam 313 fixed on the slide 103. The cam 313 consists of an elongate sheet metal member fixed on the slide and spaced somewhat above the slide by a spacer 315. The cam extends lengthwise of the slide (transversely of the record player) and has a straight cam edge 317 constituting a dwell portion extending parallel to the direction of movement of the slide and right and left inclined ends 319 and 321.

The tone arm retracting lever 287 is biased in counterclockwise direction, as viewed from above, by the spring 119, the right end of the spring being attached to a spring connector 323 which extends rearward from the pivoted end of the lever 287. The lever is biased toward a limiting position determined by its engagement with a stop pin 325 which extends upward from the plate 297. Pin 325 determines a position of the lever wherein, when the tone arm is retracted beyond the largest record which the record player is to accommodate, its retracted position being indicated by the line R in Fig. 8, the pin 291 is positioned near the side 309 of the bifurcated end of the lever, so that the pin 291 may move clockwise in an arc within the bifurcation. The bifurcation is sufficiently wide that the pin 291 and the tone arm may swing through an arc sufficient to carry the needle N to the end of any record. When the needle reaches the end of a record, the pin 291 is positioned near the other side 307 of the bifurcation.

Figure 7:
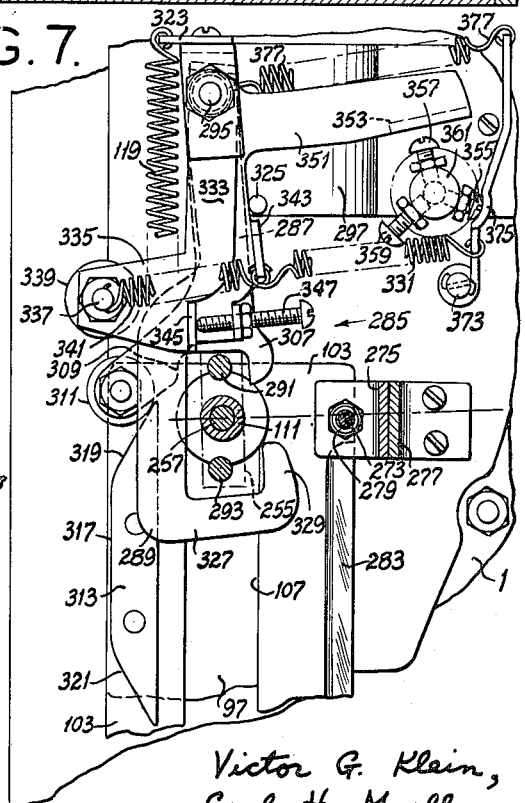
Fig. 7 is a horizontal section taken on line 7—7 of Fig. 6, illustrating parts in one operating position.
Figure 8:
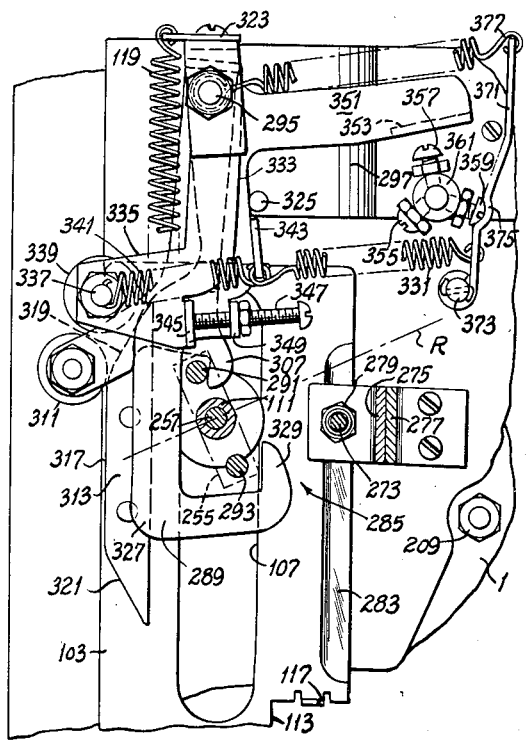
Fig. 8 is a view similar to Fig. 7 illustrating parts in another operating position.
Figure 9:
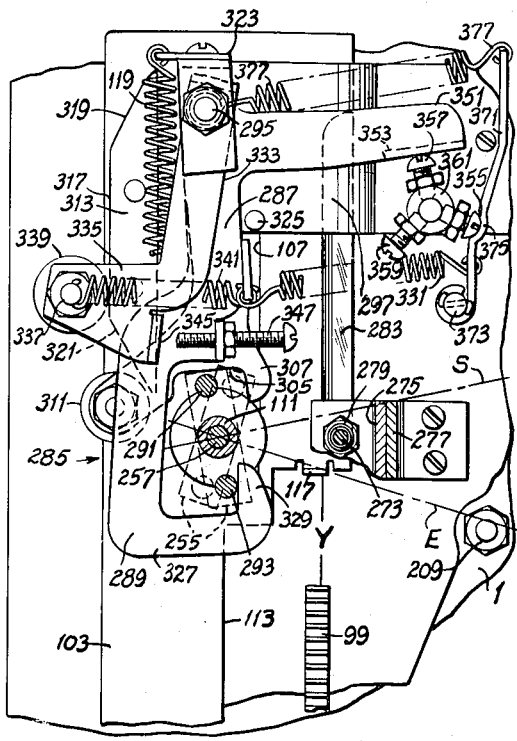
Fig. 9 is a view similar to Figs. 7 and 8 illustrating parts in still another operating position.

The action of the tone arm retracting lever 287 is as follows:

When the slide 103 is latched in its set position, with spring 119 loaded, the cam 313 is in such position that its right end is about to engage the cam follower roller 311 (Fig. 7). When the slide is released and moves to the right, the inclined right end 319 of the cam swings the lever 287 clockwise until the roller rides on to the dwell portion 317 of the cam (Fig. 8). When the roller rides down the inclined left end 321 of the cam, the lever 287 returns counterclockwise to its initial position (Fig. 9). The cam is of such length that this action is completed at the conclusion of the movement of the slide to the right subsequent to its release. When the slide is manually pulled back to the left to its set position, the inclined left end 321 of the cam swings the lever 287 clockwise until the roller 311 rides on to the dwell portion 317 of the cam. When the roller rides down the inclined right end 319 of the cam, the lever returns counterclockwise to its initial position (Fig. 7). When the lever 287 swings clockwise, it acts on pin 291 to swing the tone arm from its end-of-play position to its retracted position R (see Fig. 8). Thus, when the slide is manually moved to the left to load the spring 119, it acts through the cam 313 and the lever 287 to retract the tone arm, and when it is released and pulled to the right by the spring, it again acts through the cam 313 and lever 287 to retract the tone arm. The lengths of the inclined ends 319 and 321 of the cam 313 are less than the distances X and Y so that the tone arm is fully retracted before the turntable starts to swing.

The tone arm return lever 289 extends to the left from its pivot at 295 and its left end is in the form of a hook, as indicated at 327, reaching around in the rear of the pin 291, the post 111 and the pin 293, and continuing around the left of the pin 293 with an end portion or finger 329 in the front of the pin 293. The arrangement is such that when the lever 289 is swung clockwise as viewed from above, finger 329 engages pin 293 and swings the head 255 and the tone arm clockwise as viewed from above. The lever 289 is biased in counterclockwise direction by a tension spring 331 toward a limiting position determined by its engagement with the stop pin 325.

The tone arm return lever 289 is actuated by the cam 313 acting through a cam follower lever 333. The latter is pivoted at one end on the stud 295 within the C-shaped end of lever 289 and extends to the left above the latter. The lever 333 has a rearwardly extending arm 335 at its free end. A stud 337 extends down from the end of this arm and carries a cam follower roller 339 at its lower end at the level of the cam 313. The roller 339 is located to the right of the roller 311 as viewed from the front of the record player. The lever 333 is biased in counterclockwise direction relative to the lever 289 by a tension spring 341 connected between the upper end of the stud 337 and an ear 343 bent up at the front edge of the lever 289. Spring 341 is stronger than spring 331 and biases the lever 333 to a limiting position determined by engagement of an ear 345 bent up at the forward end of the lever 333 with a stop screw 347 adjustably threaded in an ear 349 bent up from the lever 289.

The tone arm return lever 289 has an arm 351 extending forward from a point adjacent its pivot end. This arm has a downwardly extending finger 353 at its free end. The finger 353 is adapted to come into engagement with one of three stop screws 355, 357 and 359 which extend radially outward from a rotary vertical rod 361. This rod is journalled at its lower end in a bearing 363. Stop screws 355, 357 and 359 are spaced around the rod at 120° intervals. Screw 355 extends radially outward a distance such as to limit the swing of lever 289 to an arc such as to swing the tone arm inward the proper distance to position the needle N at the beginning end of the groove of the smallest record which the record player is to accommodate, a seven-inch record as herein illustrated. Screw 357 extends radially outward a somewhat greater distance such as to limit the swing of the lever 289 to limit the return movement of the tone arm to position the needle at the beginning of the groove of an intermediate size record, a ten-inch record as herein illustrated. Screw 359 extends radially outward still a greater distance such as to limit the swing of the lever 289 to limit the return movement of the tone arm to position the needle at the beginning of the groove of the largest size record the record player is to accommodate, herein illustrated as a twelve-inch record.

The rod 361 extends upward through an opening in the top of the housing 15 and has a record-size-setting knob 364 on its upper end. The knob has a pointer and is rotary to align the pointer with any one of three index marks 365, 367 and 369, the arrangement being such when the pointer is aligned with 365 (the seven-inch record index), stop screw 355 faces the finger 353. When the pointer is aligned with 367 (the ten-inch record index) as illustrated in Fig. 1, stop screw 357 faces the finger as illustrated in Figs. 7–9. When the pointer is aligned with 369 (the twelve-inch record index), stop screw 359 faces the finger. A latch 371 is pivoted on a vertical stud 373 extending upward from plate 97 for engagement with the heads of the stop screws releasably to maintain the selected setting. The latch consists of a sheet metal stamping formed with a detent groove 375 adapted to receive the screw heads, and biased into latching engagement with the screw heads by a tension spring 377.

The tone arm switch operating finger 259 is adapted to close a tone arm switch 379 when the tone arm reaches the end of the record groove. As shown best in Figs. 6 and 10, this switch comprises a block 381 of insulation carrying a fixed contact 383 and a pivoted pendulum-type contact arm 386. The latter is pivoted to the block 381 at 385, normally hanging vertically downward, and has a rubber insulating element 387 at its lower end adapted for engagement by the finger 259. The arrangement is such that when the tone arm reaches the end of play of any size record, finger 259 engages the arm 386 and swings it against the fixed contact 383 to close the circuit through the switch. When the tone arm is retracted, arm 386 is released to swing back to its open position hanging vertically downward.

At 389 (Figs. 4, 13, 16 and 17) is shown a main control switch, located adjacent the electromagnetic latch 123. This switch is carried by an arm 391 pivoted for swinging movement about a horizontal axis on a stud 393 extending horizontally forward from the coil support 131. The arm extends to the right from its pivot and has a weight 395 on its free end. The switch comprises a pair of springy contact arms 397 and 399 fixed at one end in an insulating mounting 401 fixed on the top of the arm 391 adjacent its pivoted end. The switch arms 397 and 399 extend generally horizontally to the right from the mounting with arm 399 above arm 397. The contacts at the free ends of the arms are normally open. The arm 391 is bent downward as indicated at 403 and its free end is bent upward as indicated at 405 with the arrangement such that the free end of the arm is engaged by the left end of the slide 103 as the latter is moved into its set position to lift the arm. When the slide is released and moves to the right, the right end of the slide moves out from under the arm 391 and the latter swings downward until its free end engages the deck 1.

The switch 389 is adapted to be closed by a switch actuating rod 407 of insulating material vertically slidable in a guide tube 409 extending down from the top of the housing 15. The rod extends upward through an opening in the top of the housing and has an operating button 411 at its upper end above the housing. The rod is biased upward by a tension spring 413 connected at its ends to a pin 415 in the rod and a fastener at 416. The pin 415 engages the lower end of the guide 409 to limit the upward movement of the rod. When the button 411 is pushed down, the lower end of the rod engages the upper contact arm 399 and closes the switch. When the contacts of the switch come together, further downward movement of the rod causes both contact arms to bend downward. The contact arms are thereupon latched in circuit-closing position by a latch member 417. This consists of a flat member of insulating material, pivoted at 419 for swinging movement about a horizontal axis extending transversely of the record player above the switch, and formed with a downwardly facing shoulder 421 for engaging over the contact arms and holding them down.

The pivot 419 is fixed in a bracket 431 secured to the mounting 401. The latch member 417 has an arm 433 which projects rearward over the catch 135. The arrangement is such that when the switch arms 397 and 399 are latched closed by the latch 417 and the arm 391 is raised (Figs. 13 and 16), the latch arm 433 is raised above catch 135 to such an extent that when the coil 125 is energized and catch 135 snaps upward, it does not engage the arm 433. However, when the arm 391 is lowered (Fig. 17), the latch arm 433 is lowered to a position for engagement by the catch 135 as the latter swings upward upon energization of the coil 125. Thus, when the slide 103 is in released position, and arm 391 is accordingly lowered, upon energization of coil 125 and raising of the catch 135, the latter engages arm 433 and swings the latch member 417 counterclockwise as viewed in Fig. 17 to disengage the shoulder 421 from the contact arms 397 and 399, whereupon the latter spring apart.

Figure 18:
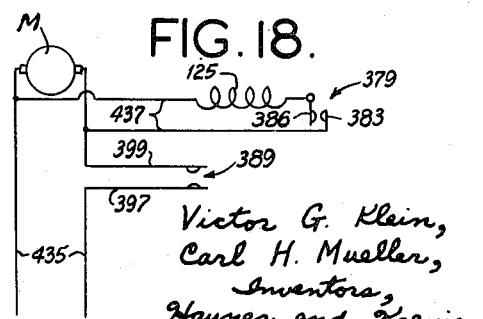

The turntable motor M is connected in a circuit 435 under control of the main switch 389, as illustrated in Fig. 18. The coil 125 is connected in a circuit 437 under control of both the main switch 389 and the tone arm switch 397. The circuit arrangement is such that coil 125 is energized only when both switches 389 and 379 are closed, and the motor is driven as long as switch 389 is closed.

The operation of the record player in playing a ten-inch record, for example, is as follows:

Assuming that the slide 103 is latched in its set position by the catch 135, and the turntable is in upright position, the knob 364 is rotated to align its pointer with the ten-inch index mark 367. This brings the ten-inch record screw 357 into operative position facing the finger 353 on the tone arm return lever 289. A ten-inch record is placed on the turntable and held thereon by the record holder 61. The button 411 is pushed down to close the main switch 389 thereby to close the circuit for the turntable motor M, whereupon the turntable is driven in clockwise direction as viewed from above through the friction gear train constituted by pinion 215, gear 216, shaft 217, gear 233, gear 235 and flywheel gear 51 (see Fig. 5). Switch 389 is latched closed by the latch 417.

The tone arm 253 is then manually applied to the upper side of the record on the upright turntable and this side of the record is played. When the needle on the tone arm enters the end portion of the record groove at the end of play, the tone arm reaching a position such as indicated by the dot-dash line E in Fig. 9, the tone arm switch operating finger 259 closes the tone arm switch 379. This completes the circuit for the latch coil 125 and the latter swings the armature 127 to the left as viewed in Figs. 11 and 12 to the dotted line position indicated in Fig. 12 and thereby swings up the catch 135 to release the slide 103. Since arm 391 is raised at this time, the upward swing of the catch 135 has no effect upon the switch latch 417, and the switch 389 remains closed so that the motor M remains in operation.

Upon release, the slide 103 is pulled toward the right by the spring 119. Snap-action of the slide is prevented by the dashpot retarding mechanism 141. The slide moves through the distance X before the finger or abutment 115 thereon engages the left end of the rack 99. During this lost-motion interval as the slide travels to the right through the distance X, the rod 273 is lifted by the cam 283 on the slide to lift the tone arm and raise the needle N out of the record groove. Then, the cam follower roller 311 on the tone arm retracting lever 287 is cammed toward the rear of the record player by the inclined right end 319 of the cam 313 on the slide, thus swinging the lever 287 clockwise as viewed from above from the position shown in Fig. 7 to the position shown in Fig. 8. As the lever swings clockwise to its Fig. 8 position, the side 307 of the bifurcated end of the lever engages the pin 291 and swings the head 255 and the tone arm 253 counterclockwise to the retracted position indicated by the dot-dash line R indicated in Fig. 8. In its retracted position, the tone arm is clear of the largest record ( a twelve-inch record) which the record player is to accommodate, as shown in Figs. 1 and 4. As the left end of the slide 103 moves out from under the free weighted end of arm 391, the latter swings down to its lowered position, latch 417 moving down with the arm and keeping the switch 389 closed.

The finger 115 on the slide then engages the left end of the rack 99 and drives the rack to the right, thereby rotating pinion 95 and the turntable cradle 19 counterclockwise as viewed from the front of the record player to the point where the pivot 179 swings over center, whereupon spring 185 swings the cradle through the remainder of its 180° swing to the limiting inverted position determined by the stop 43 wherein the turntable faces downward and the second side of the record is uppermost for playing. When the spring 185 takes over the turn-over action, pinion 95 is positively driven counterclockwise and moves the rack 99 to the right to the end of its return stroke. Since movement of the slide is retarded by the dashpot mechanism 141, and since the action of the spring 185 is unretarded, spring 185 completes the turn-over before the slide reaches its released position at the end of its return stroke, the rack 99 reaching its right-hand limit of travel before the slide reaches its released position. After completion of turn-over the slide continues to move until it reaches its released position wherein the finger 115 on the slide is closely adjacent the left end of the rack and the finger 117 on the slide is spaced from the right end of the rack the distance Y (see Fig. 9). When the turntable is inverted, gear 235 comes into mesh with gear 229 and the turntable is driven in clockwise direction as viewed from above through the friction gear train constituted by pinion 215, gear 216, shaft 217, gear 229, gear 235 and flywheel gear 51, as illustrated in dotted lines in Fig. 5.

After the cam follower roller 311 has been cammed out by the inclined right end 319 of the cam 313 and the tone arm 253 thereby retracted, the cam follower roller 339 is cammed toward the rear of the record player by 319, thus swinging the lever 333 clockwise as viewed from above from the position shown in Figs. 7 and 8 to the position shown in Fig. 9. This occurs during turn-over. As the roller 339 rides up 319, the lever 333, acting through the spring 341, swings the tone arm return lever 289 clockwise as viewed from above until the finger 329 on the lever 289 engages the pin 293. This imposes a torque on the head 255 tending to turn it clockwise as viewed from above, but the head cannot turn because it is locked against clockwise movement by pin 291 engaging the side 307 of the bifurcated end of the tone arm retracting lever 287 (Fig. 8.) The finger 329 engages the pin 293 before the roller 339 rides off 319 on to the dwell portion 317 of the cam 313. After the finger 329 engages the pin 293, the roller 339 is cammed further toward the rear of the record player and lever 333 continues to swing clockwise after lever 289 is stopped by the pin 293 until it reaches the position shown in Fig. 9, wherein spring 341 is tensioned. In this position of lever 333, the ear 345 on lever 333 is spaced from the end of stop 347 on lever 289.

After the completion of turn-over, which, as above described, occurs before the slide 103 completes its movement to the right, the cam follower roller 311 rides down the inclined left end 321 of the cam 313. The tone arm retracting lever 287 is thereupon returned counterclockwise by the spring 119 to the position illustrated in Fig. 9, which is the same as its initial position illustrated in Fig. 7. Upon this return movement of the lever 287, the side 307 of its bifurcated end moves away from the pin 291. This releases the head 255 for clockwise movement. As the lever 287 swings counterclockwise, the tone arm return lever 289, under the bias of spring 341, also swings clockwise and finger 329 engages the pin 293 and swings the head 255 and the tone arm 253 clockwise until the finger 353 on the return lever 289 engages the stop screw 357. This determines the tone arm position indicated by the dot-dash line S in Fig. 9 wherein the needle N on the tone arm is poised above the beginning end of the record groove in the ten-inch record on the turntable. Finally, the slide 103 reaches the end of its return stroke, and the lower end of the rod 273 rides off the cam 283, whereupon the needle N is lowered into the record groove to start the playing of the second side of the record.

The tone arm is free to swing during the playing of the second side of the record from the starting position S to the end of play position indicated by the dot-dash line E in Fig. 9, inasmuch as the pins 291 and 293 are unblocked for movement through the necessary arc. At the end of play of the second side of the record, the finger 259 closes the tone arm switch 379. This energizes the latch coil 125 which thereupon swings the catch 135 upward. Since the arm 391 is now lowered, the catch 135 strikes the arm 433 on the latch 417 and swings the latch 417 counterclockwise as viewed in Fig. 17. This moves the shoulder 421 out of latching engagement with the contact arms 397 and 399 and the latter spring open to open the turntable motor circuit and stop the motor. The tone arm remains in the end of play position.

To play another record, the slide 103 is returned to its set position by manually moving the knob 169 from the right end to the left end of the slot 173, and latched in set position by the engagement of the catch 135 with the detent finger 121. As the slide is pulled to the left, it first travels through the distance Y before the finger or abutment 117 thereon engages the right end of the rack 99. During this lost-motion interval as the slide is moved to the left through the distance Y, the first step in the sequence of operations is the lifting of the rod 273 by the cam 283 on the slide to lift the tone arm and raise the needle N out of the record groove. Then, the cam follower roller 311 on the tone arm retracting lever 287 is cammed toward the rear of the record player by the inclined left end 321 of the cam 313 on the slide. This swings the lever 287 clockwise as viewed from above from its Fig. 9 position toward its Fig. 8 position. As the lever swings clockwise, the side 307 of the bifurcated end of the lever engages the pin 291 and swings the head 255 and the tone arm 253 counterclockwise toward its retracted position R. As the head 255 swings counterclockwise, pin 293 engages the finger 329 on the lever 289 and swings the latter counterclockwise, this action being permitted by the spring 341, which thereupon becomes tensioned. The lever 333 remains stationary as long as roller 339 is in engagement with the dwell portion 317 of the cam 313.

The finger 117 on the slide then engages the right end of the rack 99 and drives the rack to the left. This rotates the pinion 95 and the turntable cradle 19 clockwise as viewed from the front of the record player and returns the turntable to its upright position determined by engagement of the crank arm 23 of the cradle with the stop 39. This loads the turn-over spring 185. As the slide nears its set position, the roller 339 rides down the inclined right end 319 of the cam 313. This returns the levers 333 and 289 to their initial position shown in Fig. 7. Then, when the roller 311 subsequently rides down the inclined right end 319 of the cam, the lever 287 returns to its initial position illustrated in Fig. 7. Also, as the slide reaches its set position, its left end raises the arm 391 to return the switch 389 to its raised position illustrated in Figs. 13 and 16. Thus, all the elements are restored to position for playing another record. The record holder 61 is removed, the record on the turntable taken off and replaced by the next record to be played, and playing of the latter is instigated in the same manner as above described.

In playing a seven-inch or a twelve-inch record, the operation is the same as above described except, of course, that the knob 364 is turned to bring the respective one of the seven-inch or twelve-inch stops 355 or 359 into position for engagement by the finger 353 on the tone arm return lever 289. It will be understood that these stops determine start-of-play tone arm positions for seven-inch and twelve-inch records in the same manner that stop 357 determines the start-of-play position for a ten-inch record.

It will be noted that the turntable turn-over action and the tone arm retracting and return action are not powered in any way by the turntable driving motor M. The only function of this motor is to drive the turntable. This is an important feature since with the mechanisms for effecting turntable turn-over and tone arm control independent of turntable motor power, jamming cannot occur.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. A record player comprising a turntable and means for releasably holding a record thereon with both faces of the record exposed for playing, the turntable being mounted for movement between an initial position facing in one direction and a final position facing in the opposite direction, a tone arm associated with the turntable for playing one side of a record on the turntable when the latter is in initial position and for subsequently playing the other side of the record when the turntable and record are turned over to final position, a mechanical energy accumulator for storing energy until released, means associated with the turntable and accumulator for manually moving the turntable from its final position to its initial position and storing energy in the accumulator, means for releasably retaining energy stored in the accumulator until the end of play of said one side of the record and then for releasing the stored energy, said turntable-moving means being thereupon actuated by released energy to turn over the turntable and record thereon, and means associated with the tone arm and accumulator and actuated by energy released from the accumulator for moving the tone arm to a retracted position clear of the record prior to turn-over and, after turn-over, to return the tone arm to start the playing of the other side of the record.

2. A record player comprising an invertible turntable movable between an upright position facing upward and an inverted position facing downward, means for releasably holding a record on the turntable, said turntable and means being such that both faces of a record on the turntable are exposed for playing, a tone arm associated with the turntable for playing the upper side of a record on the upright turntable and for subsequently playing the other side of the record when the turntable and record are turned over to inverted position, a spring, means associated with the turntable and spring for manually moving the turntable from inverted to upright position and loading the spring, means for holding the spring loaded until the end of play of the upper side of a record on the upright turntable and then for releasing the spring, said turntable-moving means then being actuated by the spring to turn over the turntable and record thereon, and means associated with the tone arm and spring and actuated by the spring for moving the tone arm to a retracted position clear of the record prior to turn-over and, after turn-over, to return the tone arm to start the playing of the other side of the record.

3. A record player comprising a turntable and means for holding a record thereon with both faces of the record exposed for playing, the turntable being mounted for movement between an initial position facing in one direction and a final position facing in the opposite direction, a tone arm associated with the turntable for playing one side of a record on the turntable when the latter is in initial position and for subsequently playing the other side of the record when the turntable and record are turned over to final position, a mechanical energy accumulator, a manually operable member movable between a released position and a set position and connected to the energy accumulator for storing energy therein upon movement from released to set position, means for releasably holding said member in set position with energy stored in the accumulator until the end of play of said one side of the record and then for releasing said member for movement to released position under the influence of energy stored in the accumulator, means associated with said member, the accumulator and turntable for moving the turntable from its final to its initial position upon manual movement of said member to set position and actuated by said member in moving to released position to turn over the turntable and record thereon to final position, and means associated with said member, the accumulator and tone arm and actuated by said member in moving to released position for moving the tone arm to a retracted position clear of the record prior to turn-over and, after turn-over, to return the tone arm to start the playing of the other side of the record, said last-named means also being actuated by said member upon manual movement of said member from released to set position to move the tone arm to retracted position clear of a record on the turntable immediately prior to movement of the turntable from final to initial position.

4. A record player comprising a turntable mounted for swinging movement about a horizontal axis between an upright position facing upward and an inverted position facing downward, means for releasably holding a record on the turntable, said turntable and means being such that both faces of a record held on the turntable are exposed for playing, a tone arm associated with the turntable for first playing the upper side of a record on the turntable when the latter is in upright position and for subsequently playing the other side of the record when the turntable and record are inverted, a spring, a member connected to the spring manually movable from a released position to a set position for loading the spring and movable from set position to released position by the spring, a latch for holding said member in set position with the spring loaded, means actuated by the tone arm at the end of playing the upper side of a record on the upright turntable for releasing the latch to release said member, means associated with said member and turntable for swinging the turntable from inverted to upright position upon manual movement of said member to set position, and deriving power from the spring and being actuated by said member in moving from set to released position for swinging the turntable from upright to inverted position with an interval of lost motion during the initial phase of such movement, and means associated with said member and tone arm and deriving power from the spring and being actuated by said member in moving to released position for moving the tone arm to a retracted position clear of a record on the turntable during said lost-motion interval and, after inversion has been completed, for returning the tone arm to start the playing of the other side of the record, said member, upon manual movement from released to set position, acting to swing the turntable to upright position after an interval of lost motion, and said tone-arm moving means acting to move the tone arm to retracted position clear of a record on the turntable during this last-named lost-motion interval.

5. A record player comprising a turntable mounted for swinging movement about a horizontal axis between an upright position facing upward and an inverted position facing downward, means for releasably holding a record on the turntable, said turntable and means being such that both faces of a record held on the turntable are exposed for playing, a tone arm associated with the turntable for first playing the upper side of a record on the turntable when the latter is in upright position and for subsequently playing the other side of the record when the turntable and record are inverted, a spring, a slide connected to the spring and manually movable from a released position to a set position for loading the spring, and movable from set position to released position by the spring, a latch cooperable with the slide for releasably holding it in set position with the spring loaded, means actuated by the tone arm at the end of playing a record for releasing the latch to release the slide, means acting on the slide for retarding its movement by the spring, gear mechanism actuated by the slide and acting on the turntable for swinging the turntable from inverted to upright position upon movement of the slide from released to set position after an initial interval of lost motion and for swinging the turntable from upright to inverted position upon movement of the slide from set to released position after an initial interval of lost motion, and tone-arm control mechanism actuated by the slide for swinging the tone arm to a retracted position clear of a record on the turntable during the initial lost-motion interval as the slide is manually moved from released to set position, and for swinging the tone arm to retracted position during the initial lost-motion interval as the slide is moved by the spring from set to released position and, after the slide has effected inversion of the turntable, to return the tone arm to start the playing of the second side of the record.

6. A record player comprising a turntable mounted for swinging movement about a horizontal axis between an upright position facing upward and an inverted position facing downward, means for releasably holding a record on the turntable with both of its sides exposed for playing, a tone arm associated with the turntable for playing the upper or first side of a record held on the upright turntable and, after inversion of the turntable, for playing its second side, an electric turntable motor, a drive for the turntable from the motor adapted to rotate the turntable in record-playing direction in either turntable position, a motor circuit including a normally open switch, means for manually closing the switch, a slide mounted for reciprocating movement between a released and a set position and biased by a spring toward released position, an electrically actuated latch for releasably holding the slide in set position against the bias of the spring, said latch being connected in a circuit including a tone-arm controlled switch which is closed by the tone arm at the end of playing a record side, the latch being released upon closure of said tone-arm controlled switch, gear mechanism actuated by said slide and acting on the turntable for swinging the turntable from inverted to upright position upon manual movement of the slide to set position after an initial interval of lost motion and for swinging the turntable from upright to inverted position upon movement of the slide under the bias of said spring to released position after an initial interval of lost motion, tone arm control mechanism actuated by the slide for swinging the tone arm to a retracted position clear of a record on the turntable during the initial lost-motion interval as the slide is manually moved from released to set position, and for swinging the tone arm to retracted position during the initial lost-motion interval as the slide is moved by the spring from set to released position and, after the slide has effected inversion of the turntable, to return the tone arm to start the playing of the second side of the record, and means controlled by the latch and the slide for holding the motor switch closed throughout the playing of the first and second sides of the record and actuated by the latch when the latter is moved to released position upon the closure of the tone-arm switch at the end of playing the second side of the record to open the motor switch and stop the motor.

7. In a record player, a support, a turntable carried by the support for swinging movement between an initial position facing in one direction and a final position facing in the opposite direction, a tone arm carried by the support for playing one side of a record on the turntable when the turntable is in its initial position and for playing the other side of the record when the turntable is in its final position, a member mounted on the support for movement between a released position and a set position and biased toward its set position, and being manually movable from its released to its set position against the bias, a latch for releasably holding said member in set position, gear mechanism actuated by said member for swinging the turntable including a gear which is movable relative to said member, a first means on the member for engaging said gear after an interval of lost motion to drive it in one direction as said member is manually moved from released to set position and thereby to swing the turntable from final to initial position, and a second means on said member for engaging said gear after an interval of lost motion to drive it in the opposite direction as said member moves to released position from its set position under its bias thereby to swing the turntable from initial to final position, means actuated by the tone arm at the end of playing said one side of the record for releasing said latch to release said member, and tone arm mechanism actuated by said member in moving to released position for moving the tone arm to a retracted position clear of the record during said second-mentioned interval of lost motion and, after the turntable has been swung from initial to final position, for returning the tone arm to start the playing of said other side of the record, said tone arm mechanism being actuated by said member in moving from its released to its set position for moving the tone arm to its retracted position during said first-mentioned interval of lost motion.

8. In a record player, a support, a turntable cradle mounted on the support for swinging movement about a horizontal axis, a turntable carried by the cradle rotary on an axis extending transversely to the cradle axis, stops on the support engageable by the cradle for limiting its swing to determine upright and inverted positions of the turntable, a pinion fixed to one end of the cradle on its axis, a rack slidable on the support extending transverse to the cradle axis in mesh with the pinion, a slide mounted on the support for movement transverse to the cradle axis between a released position and a set position, a tension spring fixed at one end to the slide and at its other end to the support biasing the slide to released position, the slide being manually movable to set position to load the spring, a latch for releasably latching the slide in set position, and opposed abutments on the slide spaced apart in the direction of the travel of the slide a distance greater than the length of the rack and engageable with opposite ends of the rack, one of said abutments engaging the rack after an interval of lost motion as the slide is moved to its set position for driving the rack to swing the turntable from inverted to upright position, the other abutment engaging the rack after an interval of lost motion as the slide moves to released position to swing the turntable from upright to inverted position, a tone arm carried by the support for playing the upper or first side of a record held on the upright turntable and, after inversion, for playing its second side, means actuated by the tone arm at the end of playing the first side for releasing the latch, and tone arm mechanism actuated by the slide in moving to released position for moving the tone arm to a retracted position clear of the record during said second-mentioned interval of the lost motion and, after the turntable has been inverted, for returning the tone arm to start the playing of the second side, said tone arm mechanism being actuated by the slide in moving to its set position for moving the tone arm to its retracted position during said first-mentioned interval of lost motion.

9. In a record player, a deck having an opening therein, a turntable cradle extending across the opening, said cradle comprising a beam having crank arms at its ends journalled for swinging movement about a horizontal axis located above the deck by means of pivots at the ends of the arms journalled in bearings on the deck, a turntable carried by the cradle rotary on an axis transverse to the cradle axis, stops fixed to the deck engageable by one of the crank arms for limiting the swing of the cradle to determine upright and inverted positions of the turntable, a pinion fixed on one of the pivots, a slide mounted for straight-line sliding movement on the deck transverse to the cradle axis beneath the pinion, a tension spring connected at one end to the slide and at its other end to the deck biasing the slide to a released position, said slide being manually movable from its released position to a set position against the tension of the spring, a latch for latching the slide in set position, a rack slidable on the deck extending transverse to the cradle axis in mesh with the pinion, the slide having opposed abutments spaced apart in the direction of its travel a distance greater than the length of the rack and engageable with opposite ends of the rack, one of said abutments engaging the rack after an interval of lost motion as the slide is moved to its set position for driving the rack to swing the turntable from inverted to upright position, the other abutment engaging the rack after an interval of lost motion as the slide moves to released position to swing the turntable from upright to inverted position, a tone arm carried by the support for playing the upper or first side of a record held on the upright turntable and, after inversion, for playing its second side, means actuated by the tone arm at the end of playing the first side for releasing the latch, and tone arm mechanism actuated by the slide in moving to released position for moving the tone arm to a retracted position clear of the record during said second-mentioned interval of lost motion and, after the turntable has been inverted, for returning the tone arm to start the playing of the second side, said tone arm mechanism being actuated by the slide in moving to its set position for moving the tone arm to its retracted position during said first-mentioned interval of lost motion.

10. In a record player, a deck having an opening therein, a turntable cradle extending across the opening, said cradle comprising a beam having crank arms at its ends journalled for swinging movement about a horizontal axis located above the deck by means of pivots at the ends of the arms journalled in bearings on the deck, a turntable carried by the cradle rotary on an axis transverse to the cradle axis, stops fixed to the deck engageable by one of the crank arms for limiting the swing of the cradle to determine upright and inverted positions of the turntable, a pinion fixed on one of the pivots, a slide mounted for straight-line sliding movement on the deck transverse to the cradle axis beneath the pinion, a tension spring connected at one end to the slide and at its other end to the deck biasing the slide to a released position, said slide being manually movable from its released position to a set position against the tension of the spring, a latch for latching the slide in set position, a rack slidable on the deck extending transverse to the cradle axis in mesh with the pinion, the slide having opposed abutments spaced apart in the direction of its travel a distance greater than the length of the rack and engageable with opposite ends of the rack, said slide, upon manual movement to set position, driving the rack in one direction after an initial interval of lost motion in such direction as to swing the turntable from inverted to upright position and, upon release of the latch and movement under the tension of the spring, driving the rack in the opposite direction to swing the turntable from upright to inverted position, and a spring connected to the cradle biasing it toward inverted position and adapted to be loaded upon movement of the turntable from inverted to upright position.

11. In a record player as set forth in claim 10, means connected to the slide for retarding its movement from its set to its released position.

12. In a record player as set forth in claim 10, dashpot mechanism connected to the slide for retarding its movement from its set to its released position.

13. In a record player as set forth in claim 10, said last-named spring being connected to the cradle at a point offset from the cradle axis and acting in such direction as to hold the cradle against one or the other of said stops by overcentering action.

14. In a record player as set forth in claim 13, means for reducing the overcentering action of said last-named spring in holding the cradle against that stop which determines the upright position of the turntable.

15. In a record player, a tone arm mounted to swing vertically about a horizontal axis between lifted and lowered positions and horizontally about a vertical axis, a slide mounted for straight-line movement between a released position and a set position biased toward released position by a spring and manually movable toward set position against the force of the spring, a latch for releasably holding the slide in set position with the spring loaded, means controlled by the tone arm and operable at the end of play of a record for releasing the latch, and mechanism comprising a cam on the slide and a follower actuated by the cam and engaging the tone arm for lifting the tone arm as the slide moves away from either one of its said positions and holding it lifted until the slide reaches its other position, whereupon the tone arm is lowered.

16. In a record player, a tone arm mounted to swing vertically about a horizontal axis between lifted and lowered positions and horizontally about a vertical axis, a slide mounted for straight-line movement between a released position and a set position biased toward released position by a spring and manually movable toward set position against the force of the spring, a latch for releasably holding the slide in set position with the spring loaded, means controlled by the tone arm and operable at the end of play of a record for releasing the latch, mechanism comprising a cam on the slide and a follower actuated by the cam and engaging the tone arm for lifting the tone arm as the slide moves away from either one of its said positions and holding it lifted until the slide reaches its other position, whereupon the tone arm is lowered, and mechanism comprising a cam on the slide and a cam follower lever actuated thereby and acting on the tone arm for swinging the tone arm about its vertical axis to a retracted position as the slide moves away from either one of its said positions toward the other.

17. In a record player, a tone arm mounted to swing vertically about a horizontal axis between lifted and lowered positions and horizontally about a vertical axis, a slide mounted for straight-line movement between a released position and a set position biased toward released position by a spring and manually movable toward set position against the force of the spring, a latch for releasably holding the slide in a set position with the spring loaded, means controlled by the tone arm and operable at the end of play of a record for releasing the latch, mechanism comprising a cam on the slide and a follower actuated by the cam and engaging the tone arm for lifting the tone arm as the slide moves away from either one of its said positions and holding it lifted until the slide reaches its other position, whereupon the tone arm is lowered, and mechanism comprising a cam on the slide and a tone arm retracting lever and a tone arm return lever actuated thereby and acting on the tone arm for swinging the tone arm in one direction about its vertical axis to a retracted position as the slide moves away from either one of its said positions toward the other, and for swinging the tone arm in the opposite or return direction to a start-of-play position as the slide, in moving from its set to its released position, nears its released position.

18. In a record player as set forth in claim 17, means for limiting the swing of the tone arm in return direction adjustable for determining different start-of-play positions for different sizes of records.

19. In a double side record player, a support, a turntable cradle mounted on the support for swinging movement about a horizontal axis, a turntable shaft journalled in the cradle for rotation about an axis perpendicular to the cradle axis, a turntable on the shaft movable with the cradle between an initial position facing in one direction and a final position facing in the opposite direction, said positions being determined by stops on the support engageable by the cradle, a gear on the turntable shaft, and a turntable drive comprising a drive shaft extending generally transverse to the cradle axis adjacent one end of the cradle axis, a pair of gears spaced axially on the drive shaft, and an idler gear on the cradle in engagement with the gear on the turntable shaft, said idler gear being positioned to engage one of the gears on the drive shaft when the cradle is in its initial position and to engage the other gear on the drive shaft when the cradle is in its final position, said shaft being journalled adjacent one end in a bearing mounted for universal movement upon the support, a turntable motor having a driving pinion, a gear on the drive shaft in engagement with said pinion, and means biasing the drive shaft in such direction as to maintain said last-named gear in engagement with said pinion.

20. In a double side record player, a support, a turntable cradle mounted on the support for swinging movement about a horizontal axis, a turntable shaft journalled in the cradle for rotation about an axis perpendicular to the cradle axis, a turntable on the shaft movable with the cradle between an upright position facing upward and an inverted position facing downward, said positions being determined by stops on the support engageable by the cradle, a gear on the turntable shaft, and a turntable drive comprising a drive shaft extending generally vertically adjacent one end of the cradle axis, an upper and a lower gear on the drive shaft, and an idler on the cradle in engagement with the gear on the turntable shaft, said idler gear being positioned to engage the lower gear on the drive shaft when the cradle is in its upright position and to engage the upper gear on the drive shaft when the cradle is in its inverted position, said shaft being journalled at its upper end in a bearing mounted for universal movement upon the support, a gear on the drive shaft adjacent its lower end, a turntable motor mounted on the support with its shaft extending vertically, a driving pinion on the motor shaft for engagement with said last-named gear, and a spring connected at one end to the support and at its other end to a bearing on said drive shaft acting in such direction as to bias the said lower gear into engagement with the idler gear when the turntable is upright and to bias the said last-named gear into engagement with said pinion.

21. In a record player as set forth in claim 20, the bearing for the upper end of the drive shaft being mounted in a resilient grommet carried by an arm pivoted for swinging movement about a vertical axis, and a spring connected at one end to the arm and at its other end to the support for biasing the arm and the drive shaft in the direction for engagement of the said upper gear with the idler gear when the turntable is inverted.

22. In combination, a support, a member mounted for swinging movement on the support, stops limiting the swing of said member to 180°, a gear carried by said member for rotation about an axis perpendicular to the axis of said member and offset from the latter so that said gear is movable between a first position on one side of the axis of said member and a second position on the other side, a drive shaft extending generally transverse to the axis of said member and carrying a first gear positioned for engagement by the gear on said member in its first position and a second gear positioned for engagement by the gear on said member in its second position, said shaft being journalled adjacent one end in a bearing mounted on the support for universal movement, a drive pinion, a third gear on the shaft adjacent its other end engaged with said pinion, and means biasing the shaft in such direction as to hold said third gear in engagement with the pinion and to hold one of said first or second gears on the shaft in engagement with the gear on said member.

23. In a record player, a support, a turntable cradle comprising a beam having crank arms at its ends mounted for swinging movement about an axis offset from the beam by means of pivots on the arms supported in bearings on the support, a turntable carried by the cradle rotary on an axis transverse to the cradle axis, stops on the support engageable by the cradle for limiting its swing to 180° and determining initial and final positions of the beam on opposite sides of the cradle axis and corresponding oppositely facing initial and final positions of the turntable, means adapted for manual operation to swing the beam in the direction from final to initial position and for power operation to swing the beam in the opposite direction, and an overcentering spring mechanism coupled to the cradle and comprising a spring adapted to be loaded by the manual operation of swinging the beam from final to initial position and adapted to return the beam to final position, said spring acting on a line which overcenters with respect to the cradle axis as the beam swings between its two positions thereby to hold the cradle against one or the other of the stops by overcentering action, and means on the support engageable by the spring during movement of the beam to initial position to shift the line of action of the spring to reduce its overcentering action on the cradle in initial position.

24. In a double side record player, a turntable and a tone arm for playing a record held on the turntable, the latter being automatically movable from an initial position facing in one direction for playing one side of the record by the tone arm and a final position facing in the opposite direction for playing the other side of the record, and manually movable from final to initial position, an electric turntable motor, a drive for the turntable from the motor adapted to rotate the turntable in record-playing direction in either turntable position, a normally open switch for the motor mounted for movement between a first position and a second position and biased toward its second position, a member manually movable from a released to a set position for moving the turntable to initial position and biased toward its set position for moving the turntable to final position, an electrically operated catch for releasably holding said member in set position, a switch controlling said catch and actuated by the tone arm at the end of playing either side of a record for moving the catch to released position, said motor switch being held in its first position by said member when the latter is in its set position and moving to its second position when said member moves to its released position, and a latch for holding the motor switch closed mounted for movement with the motor switch and engageable by said catch only when the motor switch is in its second position in such manner that the latch is released by the catch upon closure of the tone arm switch at the end of playing the second side of a record but not upon closure of the tone arm switch at the end of playing the first side of a record.

25. A record player comprising an invertible turntable movable between an upright position facing upward and an inverted position facing downward and adapted to hold a record with both faces of the record exposed for playing, a turntable motor, a drive for the turntable from the motor adapted to rotate the turntable in record-playing direction in either turntable position, a tone arm for playing the upper side of a record on the upright turntable and for subsequently playing the other side of the record when the turntable and record are turned over to inverted position, a manually loadable mechanical energy accumulator, means for holding energy stored in the accumulator upon manual loading, means operable by the tone arm at the end of play of the upper side of a record on the upright turntable for releasing the energy stored in the accumulator, and means thereupon powered by energy released from the accumulator and acting entirely independently of the turntable motor for sequentially moving the tone arm to a retracted position clear of the record, inverting the turntable, and then returning the tone arm to play the other side of the record.

References Cited in the file of this patent

UNITED STATES PATENTS

| | | |
|---|---|---|
| 1,343,087 | Peremi | June 8, 1920 |
| 1,981,175 | Horn | Nov. 20, 1934 |
| 2,104,241 | Proctor | Jan. 4, 1938 |
| 2,192,360 | Mann | Mar. 5, 1940 |
| 2,230,003 | Mitchell | Jan. 28, 1941 |
| 2,331,383 | Faulkner | Oct. 12, 1943 |
| 2,426,978 | Alexandersson | Sept. 9, 1947 |
| 2,501,391 | Karp | Mar. 21, 1950 |
| 2,536,432 | Faulkner | Jan. 2, 1951 |
| 2,622,884 | Carson | Dec. 23, 1952 |

FOREIGN PATENTS

| | | |
|---|---|---|
| 556,907 | Germany | Aug. 16, 1932 |
| 395,137 | Great Britain | July 13, 1933 |
| 630,793 | Great Britain | Oct. 21, 1949 |